Jan. 29, 1946.　　　T. W. MILLNS　　　2,393,924
NUT AND SCREW MECHANISM
Filed Jan. 16, 1945
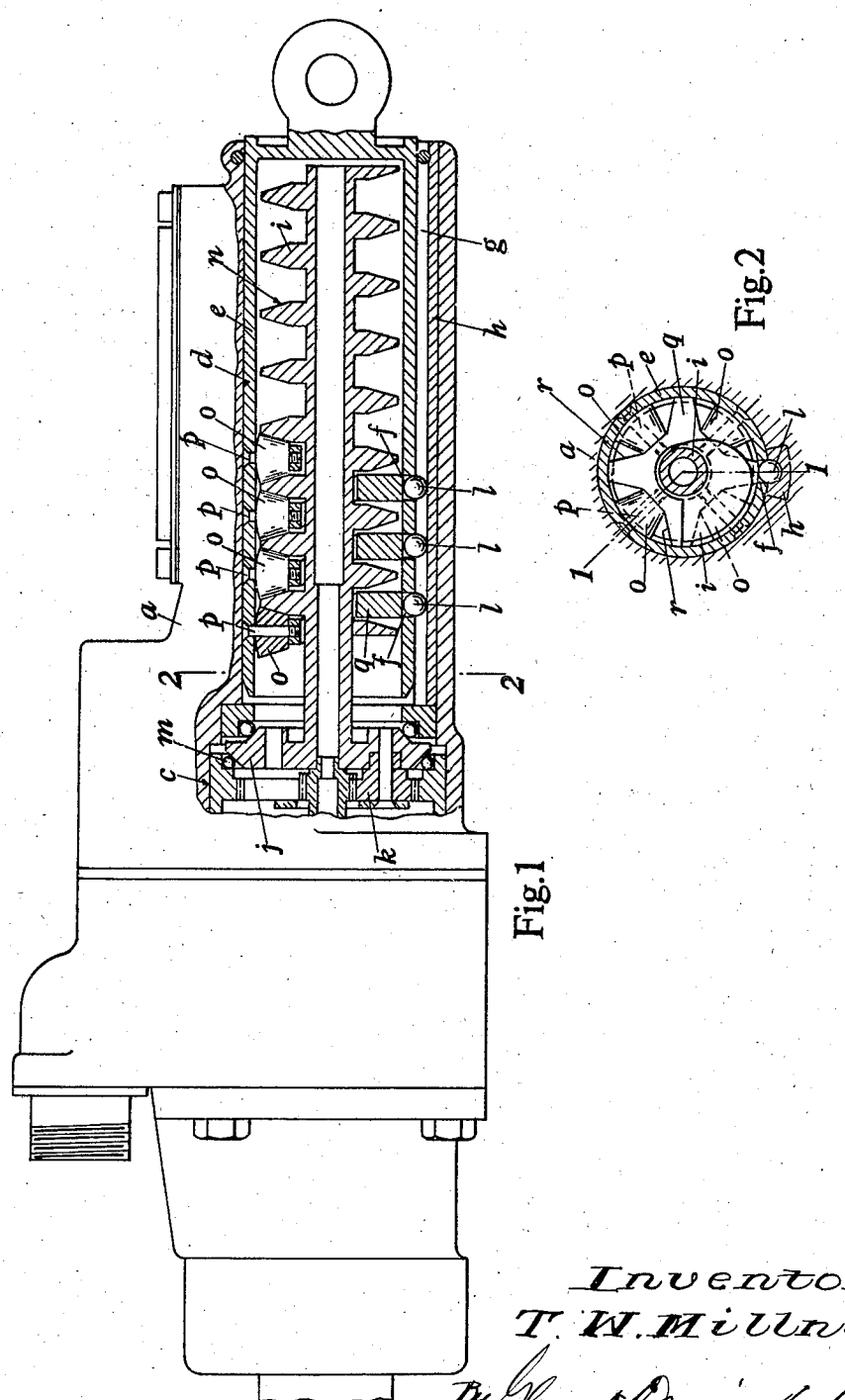
Inventor
T. W. Millns Patented Jan. 29, 1946

2,393,924

UNITED STATES PATENT OFFICE 2,393,924

NUT AND SCREW MECHANISM

Terence William Millns, Willesden Junction, London, England, assignor to Rotax Limited, London, England Application January 16, 1945, Serial No. 573,066
In Great Britain December 6, 1943

3 Claims. (Cl. 74—459)

This invention has for its object to provide an improved nut and screw mechanism. The invention is intended primarily for use in power transmission mechanisms of the kind comprising an electric motor and an epicyclic reduction gear, and more particularly for imparting motion from such a power transmission mechanism to the shutter of an aircraft engine radiator. The invention is, however, applicable to other uses.

The invention comprises the combination of a screw formed with a deep helical groove, a nut consisting of a sleeve surrounding the screw, radial pins extending inwardly from the sleeve into the said groove, rollers mounted on the pins, and a helical cage for the rollers, the cage being mounted in the said groove and being formed with gaps for accommodating and locating the rollers.

In the accompanying sheet of explanatory drawings:

Figure 1 is a part sectional side elevation of a power transmission mechanism embodying the invention, and Figure 2 is a sectional view taken on the line 2—2 of Figure 1, the sectional part of Figure 1 being taken on the line 1—1 of Figure 2.

In the drawing $a$ indicates a housing which contains an electric motor (not shown) and an epicyclic reduction gear $c$ adapted to be driven by the motor, the latter and the gear being arranged coaxially with each other.

In carrying the invention into effect as shown, I provide in the housing $a$ a hollow cylindrical chamber $d$ having its axis parallel with that of the motor and gear. In this chamber I slidably mount a sleeve $e$ to which it is required to impart axial movements for actuating a radiator shutter or for any other purpose. The sleeve $e$ is held against rotation in the chamber $d$ by one or more rows of balls $l$ which occupy holes $f$ in the sleeve and engage a longitudinal slot or slots $g$ formed either in the peripheral wall of the chamber or in a metal piece or pieces as $h$ embedded in the said wall.

Coaxially within the sleeve $e$ is mounted a rotary screw $i$ which is adapted at one end to form a carrier $j$ for a planet pinion or pinions as $k$ through which motion is imparted to the screw from the epicyclic gear $c$, this end of the screw being supported within the housing $a$ by ball bearings $m$ which co-operate with the outer portion of the carrier $j$. The screw has formed on it a deep helical groove $n$ of sufficient width to receive rollers $o$ of truncated conical form.

On the sleeve $e$, and extending radially inwards from the same into the groove $n$ of the screw $i$, are secured a number of pins $p$ on which the rollers $o$ are mounted, the rollers serving to transmit motion from the screw through the pins to the sleeve which forms a nut on the screw. Also I employ a helical cage $q$ this being mounted in the groove $n$ and being formed with gaps $r$ for accommodating and locating the rollers $o$. This cage $q$ may be attached to the sleeve $e$ by the pins $p$ or by additional pins.

By this invention I am able to provide a high-efficiency screw mechanism in a strong and serviceable form which is capable of being easily manufactured. The invention is not, however, limited to the example described as subordinate details may be varied to suit different requirements.

Having thus described my invention what I claim as new and desire to secure by Letters Patent is:

1. A nut and screw mechanism having in combination a screw formed with a deep helical groove, a nut consisting of a sleeve surrounding the screw, radial pins extending inwardly from the sleeve into the said groove, rollers mounted on the pins, and a helical cage for the rollers, the cage being mounted in the said groove and being formed with gaps for accommodating and locating the rollers.

2. A nut and screw mechanism as claimed in claim 1 and having in combination with the sleeve and a cylindrical chamber in which the sleeve is slidably mounted, balls for holding the sleeve against rotation relatively to the chamber, the balls being each arranged to occupy a hole in the sleeve and the adjacent part of a longitudinal slot in the chamber.

3. A nut and screw mechanism as claimed in claim 1, in which the screw is rotatably supported at one end, and is adapted at this end to carry at least one pinion through which motion can be imparted to the screw.

TERENCE WILLIAM MILLNS.